(No Model.)
H. B. IVES.
BOLT CASING.
No. 261,233. Patented July 18, 1882.
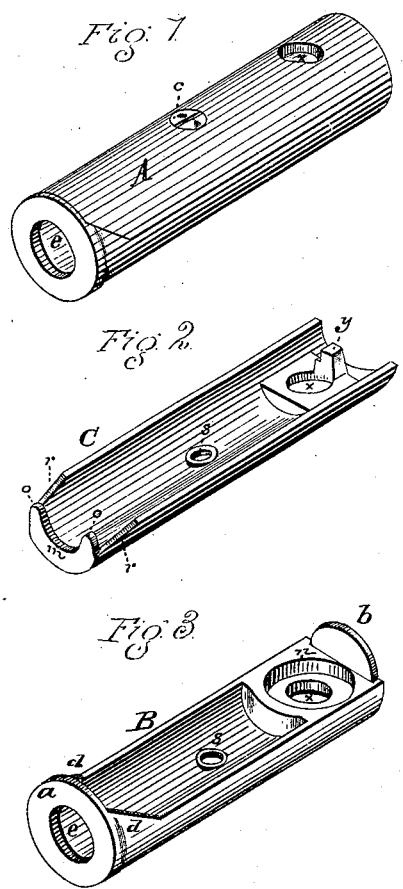
Witnesses:
Geo. L. Barnes.
Frank P. Smith.
Inventor:
Hobart B. Ives
by Geo. Terry
Atty

UNITED STATES PATENT OFFICE.

HOBART B. IVES, OF FAIR HAVEN, CONNECTICUT.

BOLT-CASING.

SPECIFICATION forming part of Letters Patent No. 261,233, dated July 18, 1882.

Application filed June 7, 1882. (No model.)

*To all whom it may concern:*

Be it known that I, HOBART B. IVES, a citizen of the United States, residing at Fair Haven, in the county of New Haven and State of Connecticut, have invented certain new and useful Improvements in Door-Bolts, of which the following is a specification, reference being had therein to the accompanying drawings, in which—

Figure 1 is a perspective view of the case, and Figs. 2 and 3 are perspective views of the parts which compose it.

The present invention relates to an improvement in that class of door-bolts which are inserted in round holes bored in the edges of doors; and it consists in the particular construction of the parts which compose the case, as they are hereinafter more fully set forth and claimed.

The cylindrical case A is composed of two parts, B and C, which approximate in form to halves of a hollow cylinder. The part B is constructed with two heads or ends, $a$ and $b$. The head $a$ forms the face-plate and has the circular perforation $e$, through which the bolt passes. That portion of the part B adjoining the face-plate is made greater than a semicircle and forms the solid braces $d$. That part of the inner head, $b$, over which the part C of the case sets is made smaller than its other part; but it may be made of the same size, and the part C of the case may be made shorter, and so that its inner end will come against the head $b$ in the same manner as its front end comes against the face-plate which is shown in Fig. 1. Into the threaded hole $s$ the screw $c$, Fig. 1, passes to hold the parts of the case together. In the hole $x$ the spindle, to which the knobs are attached, turns, and the circular recess $n$ makes room for the crank or hub, which is fastened on the spindle and operates the bolt.

The part C has the circular portion $m$, which is less than a semicircle, comes against the inside of the face-plate, and is formed with the projections $o$, which set inside of the braces $d$ in the part B and prevent any lateral movement of the front end of this part of the case. The part C also has the beveled edges $r$, which are formed to fit the braces $d$ and the central hole, $s$, which is countersunk on the outside to allow the head of the screw to pass through it to come even with the case, and also the hole $x$, through which the spindle passes. It also has the stud $y$, which serves as a support and guide to the inner end of the bolt.

The two parts B and C are fitted to set one over the other, and are held together by the screw $c$. As these cylindrical bolts are made to fit snugly in the holes in the edges of the doors and require to be moderately driven, the face-plates are very apt to be broken in the operation of driving. The braces $d$ in the part B remedy this defect, and are very important features in the improvement.

I am aware that cylindrical door-bolts have been made with cases in two parts, each part having two heads, the heads of one part setting inside the heads of the other part, and also with cases composed of two hollow cylinders, one cylinder sliding over the other cylinder; but

What I claim as my invention, and desire to secure by Letters Patent, is—

The cylindrical case A, consisting of the two parts B and C, the part B formed with two heads, $a$ and $b$, and with the perforation $e$ through the outer head to guide the bolt, and also with the solid braces $d$ to strengthen the head, the part C formed with the circular portion $m$ to come against the inside of the outer head in the part B, and also with the beveled edges $r$ to fit the braces $d$, the two parts fitted to set one over the other, and held together by a screw passing through the central holes, $s$, substantially as shown and set forth.

In testimony whereof I affix my signature in presence of two witnesses.

HOBART B. IVES.

Witnesses:
 GEORGE TERRY,
 GEO. L. BARNES.